(12) United States Patent
Koponen et al.

(10) Patent No.: US 7,738,411 B2
(45) Date of Patent: Jun. 15, 2010

(54) ARRANGEMENT FOR COMMUNICATING INFORMATION

(75) Inventors: Pekka Koponen, Espoo (FI); Juha Salokannel, Kangasala (FI); Jarno Leinonen, Lempäälä (FI)

(73) Assignee: Nokia Corporation, Espoo (FI)

( * ) Notice: Subject to any disclaimer, the term of this patent is extended or adjusted under 35 U.S.C. 154(b) by 1192 days.

(21) Appl. No.: 10/032,427

(22) Filed: Dec. 21, 2001

(65) Prior Publication Data

US 2002/0085511 A1    Jul. 4, 2002

(30) Foreign Application Priority Data

Dec. 29, 2000   (FI)   .................................. 20002899

(51) Int. Cl.
*H04J 3/08* (2006.01)
*H04B 7/14* (2006.01)

(52) U.S. Cl. ...................... 370/315; 455/41.2; 455/411; 455/558; 726/4

(58) Field of Classification Search ......... 370/277–281, 370/313, 315, 316, 328, 345, 349; 455/411, 455/435.1, 11.1, 41.2–41.3, 552.1, 553.1, 455/558; 726/4
See application file for complete search history.

(56) References Cited

U.S. PATENT DOCUMENTS

| | | | |
|---|---|---|---|
| 5,553,314 A | | 9/1996 | Grube et al. |
| 5,812,953 A | * | 9/1998 | Griffith et al. ............... 455/558 |
| 5,987,325 A | * | 11/1999 | Tayloe .................... 455/435.2 |
| 6,065,120 A | * | 5/2000 | Laursen et al. ................. 726/5 |
| 6,223,029 B1 | * | 4/2001 | Stenman et al. ............. 455/420 |
| 6,405,027 B1 | * | 6/2002 | Bell ........................... 455/403 |
| 6,445,914 B1 | * | 9/2002 | Findikli et al. .............. 455/411 |
| 6,542,758 B1 | * | 4/2003 | Chennakeshu et al. ... 455/569.2 |
| 6,587,684 B1 | * | 7/2003 | Hsu et al. .................... 455/419 |
| 6,615,057 B1 | * | 9/2003 | Pettersson .................... 455/558 |

(Continued)

FOREIGN PATENT DOCUMENTS

EP            0 310 876 A2     4/1989

(Continued)

OTHER PUBLICATIONS

English abstract from Derwent WPIL corresponding to EP 896488A.

(Continued)

*Primary Examiner*—Chi H Pham
*Assistant Examiner*—Ahmed Elallam
(74) *Attorney, Agent, or Firm*—Locke Lord Bissell & Liddell (57) ABSTRACT

The invention relates to a method for communicating information between a first wireless communication device (10) and a communications network (30) via a particular second wireless communication device (20), the communications network being said second wireless communication device's own communications network. In the method, the user identification data of said first wireless communication device (10) is transmitted to said second wireless communication device (20). In the method, said second wireless communication device (20) makes a contact to its own communications network (30) on the basis of the user identification data of said first wireless communication device (10) for communicating information between the first wireless communication device (10) and said communications network (30) via said second wireless communication device (20). The invention also relates to said first and second communications devices (10, 20).

36 Claims, 4 Drawing Sheets

U.S. PATENT DOCUMENTS

| | | | |
|---|---|---|---|
| 6,636,502 B1 * | 10/2003 | Lager et al. | 370/352 |
| 6,748,227 B1 * | 6/2004 | Rollender | 455/458 |
| 6,779,025 B1 * | 8/2004 | Wolfe et al. | 709/219 |
| 6,859,650 B1 * | 2/2005 | Ritter | 455/406 |
| 6,868,282 B2 * | 3/2005 | Carlsson | 455/558 |
| 6,871,063 B1 * | 3/2005 | Schiffer | 455/410 |
| 6,915,119 B1 * | 7/2005 | Konishi | 455/127.1 |
| 7,010,303 B2 * | 3/2006 | Lewis et al. | 455/445 |
| 7,020,118 B2 * | 3/2006 | Toyoshima | 370/338 |
| 7,171,221 B1 * | 1/2007 | Amin et al. | 455/462 |
| 7,313,366 B1 * | 12/2007 | Bristow | 455/63.1 |
| 2002/0037709 A1 * | 3/2002 | Bhatia et al. | 455/414 |
| 2002/0052193 A1 * | 5/2002 | Chetty | 455/412 |
| 2002/0056044 A1 * | 5/2002 | Andersson | 713/189 |
| 2002/0065041 A1 * | 5/2002 | Lunsford et al. | 455/41 |
| 2002/0071416 A1 * | 6/2002 | Carlson et al. | 370/338 |
| 2002/0077130 A1 * | 6/2002 | Owensby | 455/466 |
| 2002/0090913 A1 * | 7/2002 | Ritter | 455/41 |
| 2002/0101848 A1 * | 8/2002 | Lee et al. | 370/349 |
| 2002/0128002 A1 * | 9/2002 | Vu | 455/419 |
| 2003/0055735 A1 * | 3/2003 | Cameron et al. | 705/26 |
| 2004/0002902 A1 * | 1/2004 | Muehlhaeuser | 705/26 |
| 2005/0059390 A1 * | 3/2005 | Sayers et al. | 455/425 |
| 2005/0105731 A1 * | 5/2005 | Basquin | 380/247 |
| 2005/0271041 A1 * | 12/2005 | Minborg et al. | 370/352 |
| 2006/0013393 A1 * | 1/2006 | Ferchichi et al. | 380/247 |
| 2006/0015201 A1 * | 1/2006 | Lapstun et al. | 700/94 |
| 2006/0187883 A1 * | 8/2006 | Abrol et al. | 370/331 |

FOREIGN PATENT DOCUMENTS

| | | |
|---|---|---|
| EP | 0 667 725 A2 | 8/1995 |
| EP | 0 896 488 A1 | 2/1999 |
| EP | 1 075 155 A1 | 2/2001 |
| GB | 2286505 A * | 8/1995 |

OTHER PUBLICATIONS

European Patent Office Communication, Application No. EP01660239.3, Jun. 18, 2002, p. 1.

European Search Report, Application No. EP01660239.3, date of completion of search May 23, 2002, p. 1.

Annex to the European Search Report on European Patent Application No. EP01660239.3, p. 1.

* cited by examiner

ARRANGEMENT FOR COMMUNICATING INFORMATION

FIELD OF THE INVENTION

The present invention relates to an arrangement for communicating information between a first wireless communication device and a communications network via a particular second wireless communication device. Especially, but not necessarily, the invention relates to providing a communications network service to the first wireless communication device via the second wireless communication device.

BACKGROUND OF THE INVENTION

Electronic devices, such as so called palmtop computers, i.e. PDA (Personal Digital Assistant) devices, do not usually have expensive radio modem functions, such as GSM (Global System for Mobile Communications) functions, integrated into one and the same device. This type of devices are often also mobile and, thus, do not have a fixed wire connection to the network. There is, however, an increasing need to access the Internet and/or a local network from such electronic devices.

Bluetooth technology provides an inexpensive way of integrating a radio modem into many electronic devices. However, the range of the Bluetooth link, usually from approximately ten meters to a few hundred meters, does not generally allow an electronic device having a Bluetooth transceiver to reach an access point. An access point refers herein to a device coupled to a desired network, such as the Internet or a local network, such as an Ethernet local area network.

European patent application number EP 00660132.2 discloses an interesting arrangement for communicating user identification data to a wireless communication device. According to the application, a user data identification device to which a user data identification module, such as a SIM (Subscriber Identity Module) card, is inserted is arranged separate from the wireless communication device. The user data identification module contains the user identification data of the user of the wireless communication device.

The user data identification device and the wireless communication device are connected to each other by means of a local link (e.g. Bluetooth link). Upon switching on the wireless communication device it requests the user identification data from the user data identification device over the local link. The user identification data is sent to the wireless communication device as a response to said request.

Since the user data identification device with its identification module is now implemented as a separate device from the wireless communication device, the wireless communication device can be made smaller. The invention disclosed in the patent application makes it possible for more than one wireless communication device (e.g. a portable computer and a mobile station of the GSM system) to simultaneously fetch the user identification data from the identification module in the user data identification device, in which case the user can even use these different wireless communication devices simultaneously.

European patent application EP 00660132.2 does not, however, provide a solution to the problematic situation, in which the wireless communication device cannot with its short-range connection reach the access point for accessing a desired network.

The wireless communication device may have means for establishing a Bluetooth link, but it may be outside the Bluetooth range from the access point and it may lack other means for establishing a direct connection to the desired network. The other means refer, for instance, to means for establishing a longer-range radio connection to the desired network, in which case a short range refers to a range of approximately ten meters to three hundred meters achieved by a Bluetooth link, for instance, and a longer range refers to a range longer than this. A GSM cellular network connection, for instance, can have a range of over 30 kilometers. Alternatively, the other means only refer to means for establishing a connection to an available network regardless of the range.

SUMMARY OF THE INVENTION

Now, a new invention has been made. According to a first aspect of the invention there is provided a method for communicating information between a first wireless communication device and a communications network via a particular second wireless communication device, the communications network being said second wireless communication device's own communications network, in which method user identification data of said first wireless communication device is supplied to said second wireless communication device.

It is characteristic of the method that it comprises:

making a contact from said second wireless communication device to its own communications network on the basis of the user identification data of said first wireless communication device for communicating information between the first wireless communication device and said communications network via said second wireless communication device.

According to a second aspect of the invention there is provided a wireless communication device which is arranged to communicate information with a communications network via a particular second wireless communication device, the communications network being said second wireless communication device's own communications network, the wireless communication device comprising means for supplying user identification data of the wireless communication device to said second wireless communication device.

It is characteristic of the the wireless communication device that it comprises:

means for causing said second wireless communication device to make a contact to said second wireless communication device's own communications network on the basis of the user identification data of said wireless communication device for communicating information between the wireless communication device and said communications network via said second wireless communication device.

According to a third aspect of the invention there is provided a wireless communication device which is arranged to transfer information via itself between a particular second wireless communication device and a communications network the communications network being the wireless communication device's own communications network, the wireless communication device comprising means for receiving user identification data of said second wireless communication device.

It is characteristic of the wireless communication device that it comprises:

means for making a contact from the wireless communication device to its own communications network on the basis of the user identification data of said second wireless communication device for communicating information between the second wireless communication device and said communications network via the wireless communication device.

The second wireless communication device's own communications network refers herein to the closest network in which said second wireless communication device is designed to operate. If said second wireless communication device is a wireless communication device of a cellular network, for instance, its own communications network is the cellular network. Especially if said second wireless communication device is that of the GSM or UMTS (Universal Mobile Telecommunications System, a third-generation mobile network) network, the network of said second wireless communication device is the GSM or UMTS network, respectively.

Said contact making refers, for instance, to the second wireless communication device making a contact for registering to its own network using the user identification data of the user of said first wireless communication device, or to making a contact for establishing a data transfer connection, for instance a cellular network connection, between said second wireless communication device and said communications network on the basis of the user identification data transferred from said first wireless communication device.

According to a preferred embodiment of the invention, the first wireless communication device is arranged to have a short-range link to the second wireless communication device. Said second wireless communication device comprises means for making a contact to its own network. The user identification data of the first wireless communication device is transmitted over the short-range link to said second wireless communication device. Said identification data preferably comprises an IMSI (International Mobile Subscriber Identity) code, or the like, of the user of said first wireless communication device.

In an embodiment of the invention, said second wireless communication device establishes on the initiative of the first wireless communication device a connection, on behalf of the first wireless communication device, to its own communications network and transfers information, such as data, speech, multimedia or streaming-type information, for instance, between the first wireless communication device and said communications network. The second wireless communication device's own network preferably has a link to a third network, which may be the Internet or a local, preferably IP-based (Internet Protocol) network. In this way, the second wireless communication device can provide the first wireless communication device access to a network desired by the first wireless communication device, in such a manner, however, that billing the connection is done on the basis of the user identification data of the first wireless communication device. This is due to the fact that said second wireless communication device uses the user identification data of the first wireless communication device when establishing the connection.

BRIEF DESCRIPTION OF THE DRAWINGS

In the following, the invention will be described in detail with reference to the accompanying drawings, in which.

DETAILED DESCRIPTION

Figure 1:
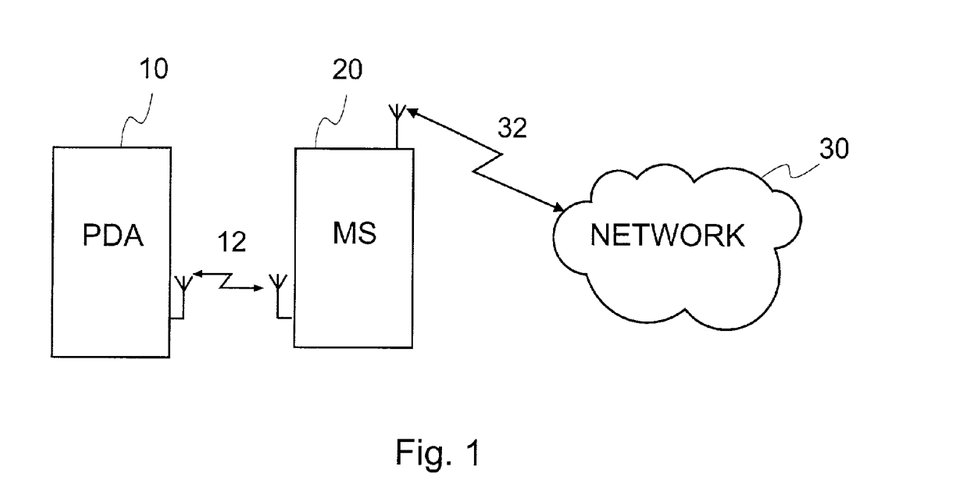
FIG. 1 illustrates a basic arrangement in a preferred embodiment of the invention.

FIG. 1 illustrates a basic arrangement in a preferred embodiment of the invention. It comprises a first wireless communication device 10, a second wireless communication device 20, and a communications network 30, to which the first wireless communication device desires to establish a connection. The first wireless communication device 10 comprises a short-range transceiver, but may lack means for establishing a direct connection to the communications network 30. The second wireless communication device 20 comprises means for making a connection to the communications network 30. According to the invention, the first wireless communication device 10 establishes a connection to the second wireless communication device 20 over a local link 12, and the second wireless communication device establishes a connection 32 to the desired communications network 30. In this way, an indirect connection is provided from the first wireless communication device 10 through the second wireless communication device 20 to the available communications network 30. The connection 32 from the second wireless communication device 20 to the desired communications network 30 is, however, authenticated with the user identification data of the first wireless communication device 10, thus allowing a network operator to bill the user of the first wireless communication device 10 for the connection 32. The invention thus makes it possible for the user of the first wireless communication device 10 to use the wireless communication device 20 of another user on his or her own account, without any costs arising to said another user.

In the following, the invention will be described using a PDA (Personal Digital Assistant) device as an example of the first wireless communication device 10 and a mobile station MS of a cellular network, such as a mobile station of the GSM network or a third-generation mobile network (e.g. UMTS), as an example of the second wireless communication device 20. It is, however, clear that the invention can also be applied to other wireless communication devices. The first wireless communication device 10 can, for instance, be an electronic book, i.e. an eBook device, which contains a Bluetooth transceiver for loading information contents, such as pages of a book or newspaper, electronically into the eBook device for reading. The GSM cellular network is used as an example of the communications network 30, to which the first wireless communication device 10 wants to establish a connection. Alternatively, the communications network 30 can be a UMTS cellular network. The GSM and UMTS networks have, in a manner known per se, a connection to the Internet via a suitable gateway, for instance, in which case if the first terminal is provided a connection to the UMTS network, for instance, it can via the connection access a local network or the Internet, from which the information content that the first terminal desires can be fetched. The Internet refers to the world-wide network of computer networks. The Internet may comprise local networks, the access to which may be limited. The gateway can be a WAP (Wireless Application Protocol) gateway, for instance.

Figure 2:
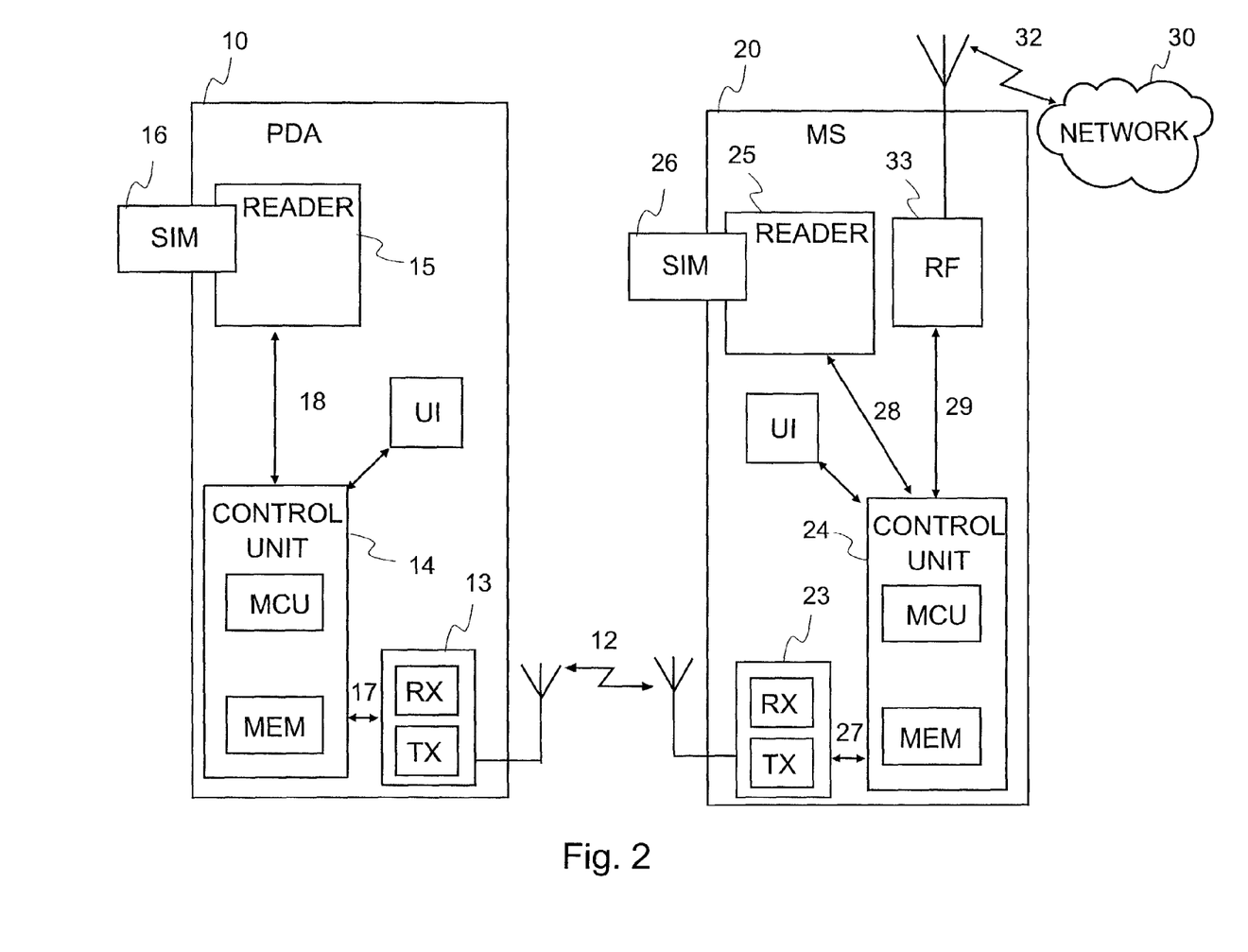
FIG. 2 illustrates in greater detail an arrangement of a preferred embodiment of the invention.

FIG. 2 shows an arrangement according to a preferred embodiment of the invention, which comprises a PDA device 10, a mobile station 20, and a communications network 30. Data transfer between the PDA device 10 and the mobile station 20 is arranged by means of a local link 12. The local link is preferably established as an LPRF (Low Power Radio Frequency connection, e.g. Bluetooth technology, WLAN (Wireless Local Area Network) technology), but other methods, such as infra-red data transmission or an RS232 connection, can also be applied. The Bluetooth technology and WLAN technology use a frequency range or 2.4 GHz. The PDA device 10 comprises short-range data transmission means 13, which comprise a transmitter TX and receiver RX, for providing a short-range data transfer connection 12 to the mobile station 20. Corresponding short-range data transmission means 23 are arranged in the mobile station 20, and they, too, comprise a transmitter TX and a receiver RX. The transmitter and receiver can be implemented separately, or integrated into one transceiver unit.

The PDA device 10 has a control unit 14 for controlling the operation of the PDA device 10. The control unit preferably comprises a memory MEM and a processor MCU or the like, such as a micro-controller or microprocessor. The control unit 14 is coupled to the data transmission means 13 with a first control and data bus 17. The PDA device 10 also comprises coupling means 15 for coupling the user data identification module 16 to the PDA device 10. Said coupling means 15 are arranged to have a data transfer connection to the control unit 14 with a second control and data bus 18. Via the second control and data bus 18, the control unit 14 can, when necessary, read data from the user data identification module 16 and write data into it. The user data identification module is a SIM card or the like. (According to one proposal, a UIM (User Identification Module) card corresponds to the SIM card in a third-generation network (UMTS)). The coupling means 15 typically contain a slot for the SIM card and a smart card reader for reading data from and writing data to the SIM card. In addition, the PDA device 10 comprises a user interface Ul for using the PDA device. The user interface Ul may have a display for displaying information to the user and a keyboard for receiving input from the user into the PDA device. The user interface Ul is coupled to the control unit 14.

The user data identification module 16 can also contain a control unit, coupling means, and memory, but these are not shown in the accompanying figures and are known to a person skilled in the art. In addition, the user data identification module 16 typically comprises means (not shown) for preventing unauthorised modification of the information (user identification information) in the user data identification module 16. The user data identification module 16 can also be implemented by software in connection with the memory means MEM of the control unit 14, for instance, in such a manner that stored data therein remains even when operating voltage is not switched on for the PDA device 10.

The mobile station 20 comprises a control unit 24 for controlling the operation of the mobile station 20. The control unit preferably comprises a memory MEM and a processor MCU or the like, such as a micro-controller or microprocessor. The control unit 24 is arranged to have a data transfer connection to the short-range data transmission means 23 of the mobile station over a third control and data bus 27. The wireless communication device 20 comprises a radio part 33 for implementing cellular network functions. The radio part transmits and receives radio signals on a radio frequency which preferably differs from the radio frequency used by the local link 12. The structure and operation of the radio part 33 is known to a person skilled in the art and, accordingly, need not be described in more detail herein. The radio part 33 is coupled to the control unit 24 with a fourth control and data bus 29. The mobile station 20 also comprises coupling means 25, known per se, for coupling the user data identification module 26 (SIM card or the like) to the mobile station 20. Said coupling means 25 are arranged to have a data transfer connection to the control unit 24 with a fifth control and data bus 28. Via the control and data bus 28, the control unit 24 can, when necessary, read data from the user data identification module 26 and write data into it. In addition, the mobile station comprises a user interface Ul for using the mobile station. The user interface Ul may have a display for displaying information to the user and a keyboard for receiving input from the user into the mobile station. The user interface Ul is coupled to the control unit 24.

In the following, the operation of the method of a preferred embodiment of the invention is described in the apparatus of FIG. 2. Let us assume that the user of the mobile station 20 has switched the operating voltage on to the mobile station, in which case the control unit 24 of the mobile station has taken the necessary initialisation steps to start up the operation of the mobile station 20. Let us also assume that the user of the mobile station has inserted into the mobile station the user data identification module 26 (SIM card) which contains the user identification data of the mobile station. The user identification data is used to identify the user. The mobile station 20 now typically displays a message in the user interface Ul (e.g. display unit) requesting the user to enter his or her own personal identity code, i.e. a PIN code. The user enters the PIN code and, assuming it was the correct one, the mobile station 20 registers to the network 30 according to prior art technology using the user identification data of the SIM card 26 for authentication. After this, the user of the mobile station 20 can, as necessary, establish a connection to the network 30 for initiating a data connection or voice call.

Let us now assume that the user of the PDA device 10 (which may be the same or a different user than the user of the mobile station 20, preferably a different user) has switched on the operating voltage to the PDA device 10, in which case the control unit 14 of the PDA device has taken the necessary initialisation steps to start up the operation of the PDA device 10. After the start-up, the user can use the PDA device for functions normally performed on it. When using the PDA device 10, the user may end in a situation which requires access to the communications network 30. The user may, for instance, want to load services to the PDA device. The services may include loading news or articles electronically from the Internet or a server of a local network (e.g. intranet, LAN (Local Area Network)).

In the above situation, the following action is preferably taken. Let us assume that the user of the PDA device has inserted into the PDA device the user data identification module 16 (e.g. SIM card). The user identification data contains, among other things, a network identifier given to the user of the PDA device by the network operator, which network identifier the user (subscriber) uses to register to the network, and an operator identifier identifying the network operator whose subscription the user (subscriber) has. Said network identifier of the user is preferably the IMSI code, or the like, of the user. (According to a proposal, an IMUI (International Mobile User Identity) code corresponds terminologically to the IMSI code in a third-generation network (UMTS)). It is known to a person skilled in the art that the user identification data can also comprise other parameters and information, such as encryption keys and SIM secrets.

The control unit 14 now generates a message which, by way of example, is called a "replace_SIM_request" message. The purpose of the "replace SIM request" message is to ask the mobile station 20 whether the mobile station 20 agrees to be used under the user identification data of another user.

The control unit 14 includes in the "replace_SIM_request" message the operator identifier. The operator identifier identifies the teleoperator whose subscription the user of the PDA device 10 has. As for the message in question and for other messages transmitted in the method, reference is made to FIG. 4 which illustrates message exchange in a preferred embodiment of the invention.

The control unit 14 now tries to establish a short-range data transfer connection 12 to the mobile station 20. This short-range data transfer connection 12 (e.g. a Bluetooth connection) is for security reasons to be established as an encrypted data transfer connection. When the short-range data transfer connection has, in a manner known per se, been established, the control unit 14 preferably transmits the "replace_SIM_request" to the mobile station 20 over the short-range data transfer connection in the following manner. The control unit 14 conveys the "replace_SIM_request" message to the short-range data transmission means 13. The transmitter of the data transmission means makes the necessary modulation actions to generate a radio signal from the "replace_SIM_request" message and to transfer the radio signal to an antenna of the local link. From the antenna of the local link, the radio signal is transmitted via the local link 12 to the mobile station 20. The radio signal being transmitted may, if necessary, have an initial synchronisation part before the actual information part so that the receiver of the mobile station can be set to receive on the correct transmission channel before the information part is transmitted.

The transmitted radio signal is received at the antenna of the short-range data transmission means 23 of the mobile station 20 and forwarded to the receiver of the data transmission means. The receiver demodulates the received radio-frequency signal to regenerate the "replace_SIM_request" from the radio signal. The "replace_SIM_request" message is conveyed via the control and data bus 27 to the control unit 24 of the mobile station. The control unit 24 of the mobile station examines the received "replace_SIM_request" message and takes the action it requires. In this case, the "replace_SIM_request" message asks the mobile station 20, whether the mobile station can be used under the user identification data of another user (in this case, the user identification data of the PDA device, which resides on the SIM card 16 inserted into the PDA device 10). In other words, the question is whether the user identification data of the PDA device 10 can be used in the mobile station 20 for connection establishment from the mobile station 20 to the communications network 30 on behalf of the PDA device.

If the mobile station 20 agrees to the use of the identification data of the PDA device (this naturally requires that the mobile station has a software that supports such a replacement of identification data), the mobile station transmits to the sender of the "replace_SIM_request" message an "accept" message, which indicates to the PDA device 10 that the mobile station 20 accepts its use under the user identification data of the PDA device 10. If the mobile station 20 rejects its use under the user identification data of the PDA device, the mobile station 20 transmits to the sender of the "replace_SIM_request" message a "reject" message, which indicates to the PDA device 10 that the mobile station 20 does not agree to the use of the identification data of the PDA device in connection establishment between the mobile station and the network 30 on behalf of the PDA device 10. A reason for rejection may be that the mobile station simply does not support the procedure proposed by the PDA device. Alternatively, the reason may be that the mobile station has an ongoing call, or that the network operator indicated by the operator identifier in the "replace_SIM_request" message cannot be reached. The reason for rejection is included in the "reject" message.

Depending on the situation, the control unit 24 of the mobile station generates an "accept" or "reject" message to be transmitted via the local link 12 to the PDA device 10. In transferring the message, the actions described in the foregoing in connection with the transmission of the "replace_SIM_request" message can be applied. In the following the transmission of the "accept" message is described. (The "reject" message is transmitted in substantially the same manner.) The control unit 24 conveys the "accept" message to the short-range data transmission means 23 of the mobile station. The transmitter of the data transmission means performs the necessary modulation actions to generate a radio signal from the "accept" message and to convey the radio signal to the antenna of the local link. From the antenna of the local link, the radio signal is transmitted via the local link 12 to the PDA device 10.

The transmitted radio signal is received at the antenna of the short-range data transmission means 13 of the PDA device and is forwarded to the receiver. The receiver demodulates the received radio-frequency signal to regenerate the "accept" message from the radio signal. The "accept" message is transmitted via the control and data bus 17 to the control unit 14 of the PDA device. The control unit 14 detects that the received message is an "accept" message transmitted in response to the "replace_SIM_request" message, in which case the control unit of the PDA device generates a "SIM_contents" message which contains user identification data of the PDA device. This data comprises the network identifier, i.e. IMSI code, or the like, of the user of the PDA device, and possibly other necessary information which the SIM card 16 inserted into the PDA device contains. The purpose of the "SIM_contents" message is to transmit the necessary user identification data of the PDA device 10 to the mobile station 20 so that the mobile station 20 can register to the communications network 30 using the user identification data of the PDA device.

The control unit 14 conveys the "SIM_contents" message to the short-range data transmission means 13. The transmitter of the data transmission means performs the necessary modulation actions to generate a radio signal from the "SIM_contents" message and to convey the radio signal to the antenna of the local link. From the antenna of the local link, the radio signal is transmitted via the local link 12 to the mobile station 20.

The transmitted radio signal is received at the antenna of the short-range data transmission means 23 of the mobile station and is forwarded to the receiver. The receiver demodulates the received radio-frequency signal to regenerate the "SIM_contents" message from the radio signal. The "SIM_contents" message is conveyed via the control and data bus 27 to the control unit 24 of the mobile station. The control unit 24 of the mobile station examines the received "SIM_contents" message and takes the action it requires. In this case, the control unit 24 begins to register to its own network, i.e. the cellular network 30, using the user identification data of the PDA device 10, i.e. the IMSI code of the PDA device. The registration to the network takes place in a manner known per se. The difference is only that instead of the user identification data of the mobile station 20, the user identification data of the PDA device 10 is used.

The following describes a simplified manner for the mobile station 20 to register to the network. The registration process is known per se to a person skilled in the art, so a more detailed description is not necessary herein. In the registration process, the control unit 24 of the mobile station generates an "authentication" message which contains the IMSI code, or the like, of the user of the PDA device 10. The control unit 24 conveys the "authentication" message via the control and data bus 29 to the radio part 33. The radio part comprises a transceiver, which performs the necessary modulation actions to generate a radio signal from the "authentication" message and to convey the radio signal to the antenna of the radio part 23. From the antenna of the radio part, the radio signal is transmitted via the cellular network connection 32 to the network 30. As earlier noted, the network is preferably a cellular network, such the GSM or UMTS network.

The transmitted radio signal is received at the network 30 where it is demodulated to regenerate the "authentication" message from the radio-frequency signal. The network processes the "authentication" message and takes the action it requires. In this case, the network 30 examines whether it can accept the registration to the network 30 of the subscriber identified by the user identification data (IMSI code or the like). This is typically done by a challenge-response procedure. In it, the network 30 generates a random number RAND and transmits it as a challenge over the cellular network connection 32 to the mobile station 20 which, in turn, transmits the random number RAND over the local link 12 to the PDA device. The control unit of the PDA device receives the random number RAND and transfers it over the second control and data bus 18 to the SIM card 16 in the slot of the reader 15. The processor of the SIM card generates a response SRES on the basis of the random number RAND and a specific SIM secret Ki and using a particular algorithm, and the response is transmitted from the SIM card 16 to the control unit 14 of the PDA device. The control unit 14 transmits the response SRES over the local link 12 to the mobile station 20 from which it is transmitted on to the network 30 via the cellular network connection 32. The network 30 which knows said SIM secret Ki, generates, on its part, a SRES using the same algorithm as the processor of the SIM card 16. When the network 30 receives the response SRES via the mobile station 20 from the SIM card 16 of the PDA device, the network 30 compares the SRES that it has generated by itself to the SRES received from the SIM card 16 of the PDA device. If the SRES generated by the network matches the SRES received from the SIM card 16, the network 30 accepts the registration of the mobile station 20 to the network using the user identification data of the PDA device 10.

If the network 30 accepts the registration of the subscriber (the user/subscriber identified by the IMSI code of the SIM card of the PDA device) to the network, an "accept" message is transmitted from the network to the sender of the "authentication" message to indicate to the wireless communication device that the network accepts the registration of the subscriber to the network. If the network rejects the registration, a "reject" message is transmitted from the network to the sender of the "authentication" message to indicate to the wireless communication device that the network 30 does not accept the registration of the subscriber to the network. The reason for rejection may be that the subscriber in question simply does not have permission to register to the network of the network operator in question. The reason for rejection is included in the "reject" message.

Figure 4:
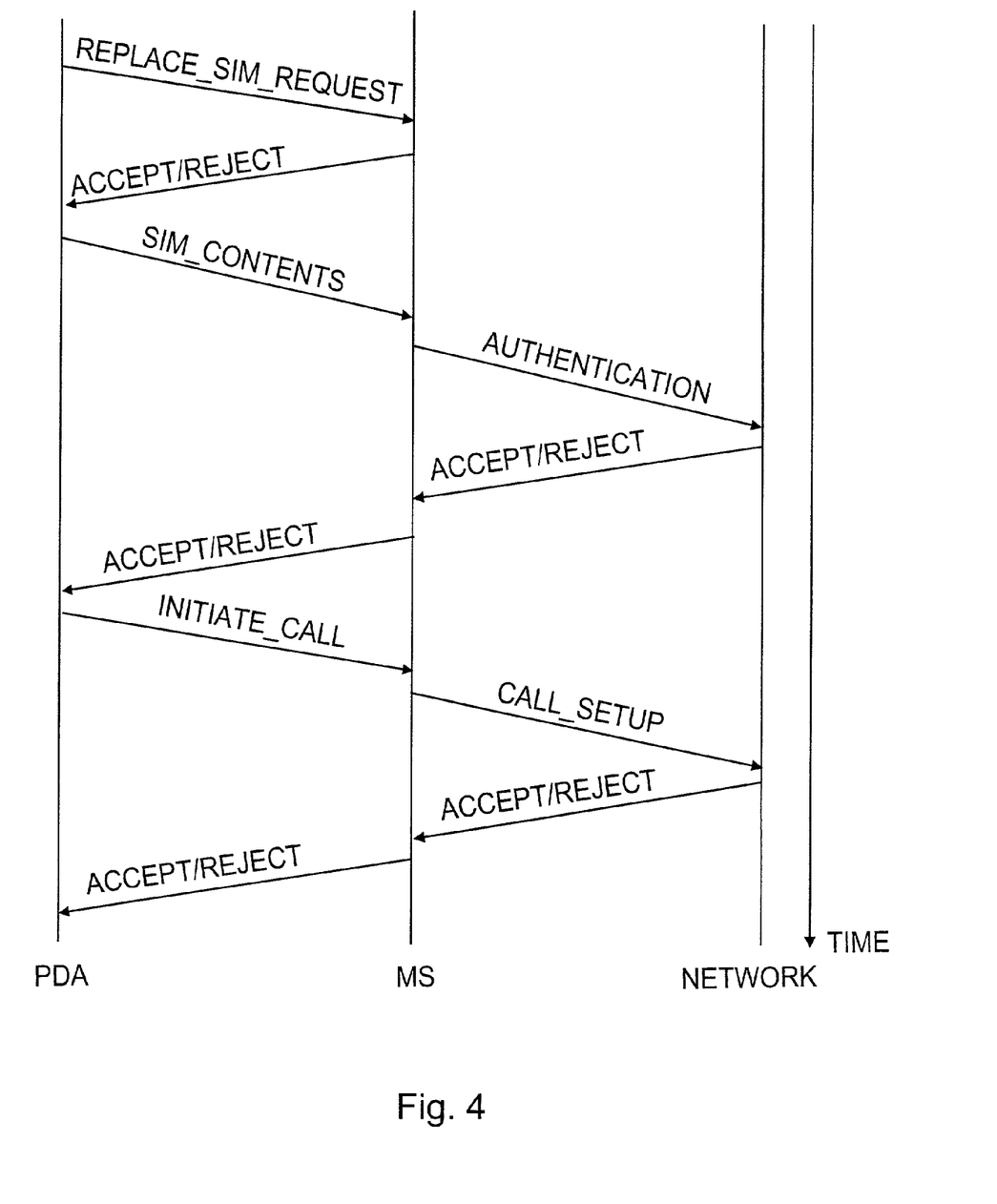
FIG. 4 illustrates exchanging messages in a preferred embodiment of the invention.

Even though the messages associated with the registration process have been shown in a simplified manner with two messages in FIG. 4, it is clear to a person skilled in the art that network registration can be a multistage process, as already alluded in connection with the description of the challenge-response procedure. The messages that in the registration process are transferred between the wireless communication device and the network may differ from what is stated above, but are known to a person skilled in the art.

For the network, it is irrelevant per se, whether the user of the mobile station 20 or the user of the PDA device 10 registers to the network with the mobile station 20. The registration process is similar for the network in both cases. In most cases, it is necessary that the mobile station 20 using the user identification information of its own SIM card 26 de-registers from the network 30 in a manner known per se before registering to the network using the user identification data of the PDA device.

Let us now examine the reception of the "accept" message transmitted in response to the "authentication" message in the mobile station 20. (A "reject" message is received in substantially the same manner.) The mobile station 20 receives a radio-frequency signal transmitted by the network 30 and containing the "accept" message at the antenna of the radio part 33. From the antenna, the radio signal is conveyed to the receiver of the radio part 33, which demodulates the received radio-frequency signal to regenerate the "accept" message from the radio signal. The "accept" message is transmitted via the control and data bus 29 to the control unit 24 which identifies the "accept" message as a response transmitted to the "authentication" message. The "accept" message indicates to the control unit that the registration to the network 30 was successful. The mobile station 20 informs the PDA device 10 of this. This takes place in such a manner that the control unit 24 transmits the "accept" message received from the network on to the PDA device. The transmission occurs over the local link 12 in a respective way as described in the foregoing description. The control unit 24 thus conveys the "accept" message to the short-range data transmission means 23. The transmitter of the data transmission means performs the necessary modulation actions to generate a radio signal from the "accept" message and to convey the radio signal to the antenna of the local link. From the antenna of the local link, the radio signal is transmitted over the local link 12 to the PDA device 10.

The transmitted radio signal is received at the antenna of the short-range data transmission means 13 of the PDA device and is conveyed to the receiver of the PDA device data transmission means. The receiver demodulates the received radio-frequency signal to regenerate the "accept" message from the radio-frequency signal. The "accept" message is conveyed via the control and data bus 17 to the control unit 14 of the PDA device. The control unit 14 detects that the received message is an "accept" message transmitted as an indirect response to the "SIM_contents" message. The "accept" message indicates to the PDA device that the mobile station 20 has succeeded in registering to the network using the data on the SIM card 16 of the PDA device.

The mobile station 20 stores into its memory information on the fact that the registration to the network 30 was done using the user identification data of the PDA device. On the basis of this information, the mobile station can in a connection established later forward to the PDA device 10 information, such as data, received from the network 30.

Depending on what services the user of the PDA device 10 has subscribed to his or her SIM card 16, the PDA device 10 can establish a circuit-switched connection (e.g. a data call or an HSCSD (High Speed Circuit Switched Data) connection) and/or a packet-switched connection (e.g. a GPRS (General Packet Radio Service) connection) to the network 30 via the mobile station 20.

If the PDA device 10 wants to setup a data call connection, for instance, this is performed as follows. The control unit 14 of the PDA device first generates an "initiate_call" message. The address of the receiver, for instance a telephone number or IP (Internet Protocol) number, is attached to the "initiate_call" message. It is clear to a person skilled in the art that the "initiate_call" message may also comprise lots of other information, for instance user identification data of the PDA device 10, such as the IMSI code.

The control unit 14 conveys the "initiate_call" message to the short-range data transmission means 13. The transmitter of the data transmission means performs the necessary modulation actions to generate a radio signal from the "initiate_call" message and to convey the radio signal to an antenna of the local link. From the antenna of the local link, the radio signal is transmitted via the local link 12 to the mobile station 20.

The transmitted radio signal is received at the antenna of the short-range data transmission means 23 of the mobile station and is forwarded to the receiver. The receiver demodulates the received radio-frequency signal to regenerate the "initiate_call" message from the radio signal. The "initiate_call" message is conveyed via the control and data bus 27 to the control unit 24 of the mobile station. The control unit 24 of the mobile station examines the received "initiate_call" message and takes the action it requires. In this case, the "initiate_call" message has been transmitted to set up a data call connection. On the basis of the information in the "initiate_call" message, the control unit 24 generates a prior-art call set-up request, i.e. a "call_setup" message to set up a data call. To identify the user, the IMSI code, or the like, of the user of the PDA device 10 is preferably attached to the "call_setup" message. The mobile station 20 transmits the "call_setup" message via the antenna of its radio part 33 to the network 30. The network either accepts or rejects the call set-up request. If the network 30 accepts the call set-up request, it transmits an "accept" message to the mobile station 20 in response to the "call_setup" message. If the network 30 rejects the call set-up request (e.g. too high a load in the network), it transmits a "reject" message to the mobile station 20 in response to the "call_setup" message. The mobile station 20 receives the message ("accept" or "reject") transmitted by the network 30 at the antenna of its radio part 33 and forwards the message to the receiver and from it, after demodulation actions, further to the control unit 24. The mobile station 20 transmits the message received from the network further via the local link to the PDA device 10 to let the PDA device know whether the call set-up request was accepted or rejected. It is clear to a person skilled in the art that the messages transmitted between the mobile station 20 and the network 30 in setting up a call may differ from what is stated above, call set-up between the mobile station 20 and the network 30 is known to a person skilled in the art. The essential thing is that the call is set up between the mobile station 20 and the network 30 using the user identification data of the PDA device 10, such as the IMSI code or the like. The mobile station 20 routes the call to the PDA device 10 over the local link 12.

This way, the PDA device 10 can set up a data call connection from the mobile station 20 to a number from which a desired information content, such as a piece of news or article, can be downloaded, and download it to its memory via the mobile station 20. In practice, the PDA device 10 can, for instance, generate a WAP WSP (Wireless Session Protocol) GET request and transmit it via the local link 12 to the mobile station 20. The mobile station 20 receives the WAP WSP GET request and transmits it on via the data call connection to a WAP gateway (not shown) in the network 30. The WAP gateway fetches in a manner known per se the information content desired by the PDA device from the database of the service provider, which can, for instance, reside on an Internet server or a server of a local network, and transmits the information content via the network 30 over the data call connection to the mobile station 20. The mobile station receives the information content and transmits it on to the PDA device via the local link 12. Alternatively, the connection 32 between the mobile station 20 and the network 30 can be some other data connection than a data call connection, such as a GPRS connection or another data connection supported by the WAP protocol.

The invention is preferably implemented between the PDA device 10 and the mobile station 20 by using an application-specific protocol, herein referred to as an AIRC (Access Identifier Replacement Control) protocol. The above messages "replace_SIM_request", "SIM_contents", "initiate_call", "accept" and "reject" are all messages according to the AIRC protocol. The AIRC protocol can be implemented as a separate module in the PDA device and a separate module in the mobile station in such a manner that the AIRC modules are coupled to the control units of the devices. Alternatively, the AIRC protocol can be integrated to the rest of the PDA device and mobile station software.

Figure 3:
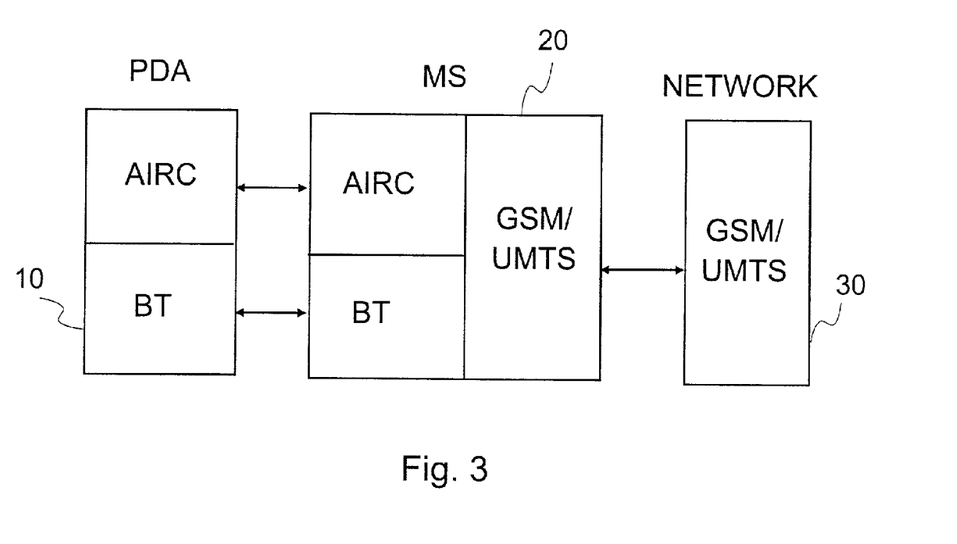
FIG. 3 illustrates a data transfer method in a preferred embodiment of the invention.

FIG. 3 illustrates in a simplified manner a data transfer method in a preferred embodiment of the invention. Communication between the PDA device 10 and the mobile station 20 takes place over a local link. In the examplary case of FIG. 3, the local link is a Bluetooth link. The AIRC protocol layer is on top of the Bluetooth protocol layer BT in both the PDA device and the mobile station. The AIRC protocol layer of the PDA device communicates with the AIRC protocol layer of the mobile station. The messages of the AIRC layer are transferred with the aid of the Bluetooth layer BT. GSM and/or UMTS protocols are used in the communication between the mobile station 20 and the network 30.

The purpose of the AIRC protocol is to make the PDA device 10 and the mobile station 20 understand each other. The AIRC protocol thus creates a set of rules for message exchange between the PDA device and the mobile station so that the PDA device and the mobile station can generate the messages according to the invention and process correctly the messages they receive from each other.

In addition to the messages described above, other messages can be implemented using the AIRC protocol. For instance, if no information has been transmitted for a long time over the Bluetooth link acting as the local link 12, the mobile station 20 generates a "PDA_SIM_alive" message to find out from the PDA device 10, if it still needs the connection 32 to the network. In practice, the mobile station transmits the "PDA_SIM_alive" message over the Bluetooth link when a pre-defined timer in the mobile station is expired after a long idle time in the Bluetooth connection. If the PDA device does not respond to the "PDA_SIM_alive" message with an "acknowledgement" message, the mobile station 20 decides that the connection 32 to the network is no longer needed and disconnects it and can again start to use its own SIM card (registers to the network with its own SIM card 26). If the PDA device responds to the "PDA_SIM_alive" message with an "acknowledgement" message, the mobile station deduces that the connection 32 is still needed.

In a normal case, the PDA device 10 transmits a "SIM_replace_end" message over the local link 12 to the mobile station to indicate to the mobile station 20 that the data connection 32 from the terminal to the network 30 is no longer needed, in which case the mobile station disconnects the connection to the network and can again start to use its own SIM card 26.

Figure 5:
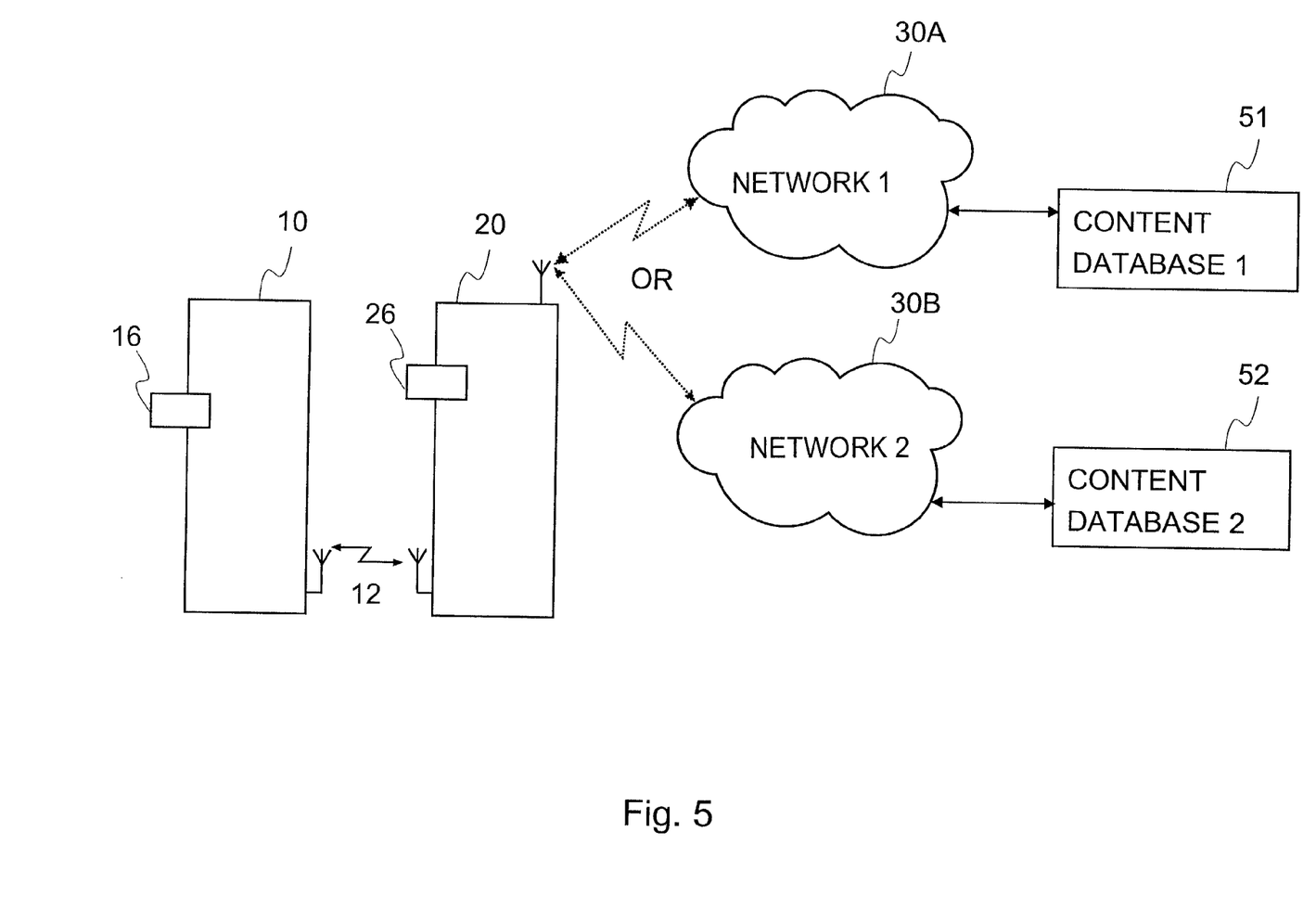
FIG. 5 illustrates a particular second embodiment of the invention.

FIG. 5 illustrates another embodiment of the invention. In this embodiment, the SIM card 26 of the mobile station 20 is the SIM card of an operator 1, and the SIM card 16 of the PDA device 10 is the SIM card of an operator 2. The operators 1 and 2 are different teleoperators. Let us assume that a service provider 1 has made an agreement with the operator 1, in which case a content database 51 (content database 1) maintained by the service provider 1 is connected to a network 30A (network 1) operated by the operator 1. Let us also assume that a service provider 2 has made an agreement with the operator 2, in which case a content database 52 (content database 2) maintained by the service provider 2 is connected to a network 30B (network 2) operated by the operator 2. The content databases 51 to 52 are databases from which information contents, such as electronic articles or pages of an electronic newspaper or book, can be fetched to the PDA device. The mobile station 20 can, as described earlier in this description, establish a connection to the network 30B of the operator 2 using the user identification data of the PDA device 10 in the SIM card 16 of the PDA device, and fetch one or more information contents from the content database 52 to the PDA device via the mobile station. However, if the PDA device wants to fetch an information content from the content database 51 connected to the network 30A of another operator (operator 1), the mobile station 20 can de-register from the network 30B operated by the operator 2 and register to the network 30A operated by the operator 1 with its own SIM card. Further, the mobile station can fetch an information content from the content database 51 connected to the network 30A and transfer the information content over the Bluetooth connection 12 to the PDA device. This way, an information content can be fetched to the PDA device 10 regardless of which operator each service provider has made an agreement with.

A person skilled in the art understands that the names used for different messages and the AIRC protocol in this description are for example only, and they are mainly used for illustrative purposes herein. The implementation of the invention is thus not restricted to the use of these specific messages.

This description describes the implementation and embodiments of the invention by means of examples. It is obvious to a person skilled in the art that the invention is not restricted to the details of the embodiments described in the foregoing and that the invention can be implemented in other ways without departing from the characteristics of the invention. The presented embodiments should be considered illustrative, but not restrictive. The implementation and use of the invention are thus restricted only by the attached claims. Therefore, different alternative implementations of the invention, including equivalent implementations, defined by the claims fall within the scope of the invention.

The invention claimed is:

1. A method, comprising:
receiving at a mobile station user identification data of a first wireless communication device over a wireless local link;
establishing and authenticating connection through the mobile station to the mobile station's own communications network using the received user identification data of said first wireless communication device, said establishing and authenticating being by transmitting by the mobile station at least a portion of information in the received user identification data to the communications network, receiving a challenge by the mobile station from the communication network to the first wireless device, forwarding the challenge to the first wireless device, receiving a response to the challenge by the mobile station from the first wireless device, and forwarding the response by the mobile station to the communication network;
receiving at the mobile station an information content from said communications network over said connection; and
transmitting said information content to said first wireless communication device over said wireless local link.

2. A method as claimed in claim 1, wherein said communications network is the closest communications network in which said mobile station is arranged to operate.

3. A method as claimed in claim 1, wherein said mobile station is a communication device of a cellular network, and said communications network is a cellular network.

4. A method as claimed in claim 1, wherein said mobile station is closer to said communications network than said first wireless communication device, and a connection between said mobile station and the communications network is identified on the basis of data transmitted from the first wireless communication device.

5. A method as claimed in claim 1, wherein said mobile station establishes a connection to its own communications network on the basis of the user identification data of said first wireless communication device and on the initiative of said first wireless communication device.

6. A method as claimed in claim 1, wherein the mobile station establishes a connection to its own communications network on behalf of said first wireless communication device.

7. A method as claimed in claim 1, wherein from a particular server of a particular service provider, information content is distributed via said communications network and said mobile station to said first wireless communication device in such a manner that the information content is transferred from said server via said communications network to said mobile station, and the information content is transmitted from said mobile station to said first wireless communication device over a short-range link;
wherein said mobile station is configured to receive said user identification data from a user identification data identification module comprising said user identification data of the user of said first wireless communication device.

8. A method as claimed in claim 1, further comprising:
transferring information between the first wireless communication device and said communications network via said mobile station in such a manner that:
in the section between the first wireless communication device and the mobile station, the information is communicated over a local link, and
in the section between the mobile station and the communications network, the information is communicated over a cellular network connection;
wherein said mobile station is configured to receive said user identification data from a user data identification module comprising said user identification data of the user of said first wireless communication device.

9. A method as claimed in claim 8, wherein said local link is a wireless short-range radio link.

10. A method as claimed in claim 1, further comprising providing to said first wireless communication device a communications network service via said mobile station, in which service an information content is transmitted via said communications network and said mobile station to the first wireless communication device.

11. A method as claimed in claim 1, wherein said user identification data of the first wireless communication device comprises at least one of the following: IMSI (International Mobile Subscriber Identity) code, IMUI (International Mobile User Identity) code.

12. A method as claimed in claim 1, wherein said mobile station registers to its own communications network using the user identification data of said first wireless communication device.

13. A method as claimed in claim 1, wherein said first wireless communication device is one of the following: PDA (Personal Digital Assistant) device, eBook (electronic Book) device.

14. A method as claimed in claim 1, wherein said user identification data comprises an operator identifier.

15. A method as claimed in claim 1, wherein said first wireless communication device is configured to receive a user data identification module comprising said user identification data of the user of said first wireless communication device.

16. A method as claimed in claim 15, wherein said user data identification module is a module of a first operator, with the aid of which module the first wireless communication device can register, via said mobile station, to a network operated by said first operator.

17. A method as claimed in claim 1, wherein said first wireless communication device does not have a long-range communication capability necessary to directly communicate with said network;
wherein said mobile station is configured to receive said user identification data from a user data identification module comprising said user identification data of the user of said first wireless communication device.

18. An apparatus, comprising:
a transmitter in a first wireless communication device for supplying user identification data of the first wireless communication device to a mobile station over a wireless local link;
a control unit in the first wireless communication device, coupled to the transmitter, for establishing and authenticating a connection through said mobile station to said communications network using the user identification data of said first wireless communication device, for transferring information content between the first wireless communication device and said communications network via said mobile station, said establishing and authenticating being by transmitting at least a portion of information in the received user identification data to the mobile station for forwarding by the mobile station to the communications network, receiving a challenge from the mobile station that has been forwarded by the mobile station from the communication network, and transmitting a response to the challenge to the mobile station for forwarding by the mobile station to the communications network.

19. The apparatus of claim 18, wherein said received user identification data comprises an operator identifier.

20. The apparatus of claim 18, wherein said first wireless communication device does not have a long-range communication capability necessary to directly communicate with said network;
wherein said mobile station is configured to receive said user identification data from a user data identification module comprising said user identification data of the user of said first wireless communication device.

21. An apparatus, comprising:
a transmitter in a first wireless communication device for supplying user identification data of the first wireless communication device to a mobile station over a wireless local link;
a control unit in the first wireless communication device, coupled to the transmitter, for establishing and authenticating a connection through said mobile station to said communications network using the user identification data of said first wireless communication device, for transferring information content between the first wireless communication device and said communications network via said mobile station, said establishing and authenticating being by transmitting at least a portion of information in the received user identification data to the mobile station for forwarding by the mobile station to the communications network, receiving a challenge from the mobile station that has been forwarded by the mobile station from the communication network, and transmitting a response to the challenge to the mobile station for forwarding by the mobile station to the communications network.

22. The apparatus of claim 21, wherein said user data identification module is a module of a first operator, with the aid of which module the first wireless communication device can register, via said mobile station, to a network operated by said first operator.

23. An apparatus, comprising:
means in a first wireless communication device for supplying user identification data of the first wireless communication device to a mobile station over a wireless local link;
means in the first wireless communication device, for establishing and authenticating a connection through said mobile station to a communications network using the user identification data of said first wireless communication device for transferring information content between the wireless communication device and said communications network via said mobile station, said establishing and authenticating being by transmitting at least a portion of information in the received user identification data to the mobile station for forwarding by the mobile station to the communications network, receiving a challenge from the mobile station that has been forwarded by the mobile station from the communication network, and transmitting a response to the challenge to the mobile station for forwarding by the mobile station to the communications network.

24. A non-transitory computer readable medium having computer executable program code therein, comprising:
computer executable program code in said computer readable medium for receiving at a mobile station user identification data of a first wireless communication device over a wireless local link;
computer executable program code in said computer readable medium for establishing and authenticating a connection through the mobile station to the mobile station's own communications network using the user identification data of said first wireless communication device, said establishing and authenticating being by transmitting by the mobile station at least a portion of information in the received user identification data to the communications network, receiving by the mobile station a challenge from the communication network to the first wireless device, forwarding the challenge to the first wireless device, receiving by the mobile station a response to the challenge from the first wireless device, and forwarding by the mobile station the response to the communication network;
computer executable program code in said computer readable medium for receiving at the mobile station an information content from said communications network over said connection; and
computer executable program code in said computer readable medium for transmitting said information content to said first wireless communication device over said wireless local link.

25. A method, comprising:
- receiving user identification data of a first wireless communication device at a mobile station; and
- establishing and authenticating through the mobile station a connection initiated by said first wireless communication device to said communications network using the user identification data of said first wireless communication device, for transferring information content between the first wireless communication device and said communications network via said mobile station, said establishing and authenticating being by transmitting by the mobile station at least a portion of information in the received user identification data to the communications network, receiving by the mobile station a challenge from the communication network to the first wireless device, forwarding the challenge to the first wireless device, receiving by the mobile station a response to the challenge from the first wireless device, and forwarding by the mobile station the response to the communication network.

26. A method as claimed in claim 25, wherein said mobile station is a communication device of a cellular network, and said communications network is a cellular network.

27. A method as claimed in claim 25, wherein said first wireless communication device is one of the following: PDA (Personal Digital Assistant) device, eBook (electronic Book) device.

28. A method as claimed in claim 25, wherein said user identification data of the first wireless communication device comprises at least one of the following: IMSI (International Mobile Subscriber Identity) code, IMUI (International Mobile User Identity) code.

29. An apparatus, comprising:
- a receiver in a mobile station for receiving user identification data of a first wireless communication device, said mobile station having its own communications network;
- a control unit in the mobile station, coupled to the receiver, for establishing and authenticating a connection through the mobile station to the mobile station's own communications network using the user identification data of said first wireless communication device, for transferring information content between the first wireless communication device and said communications network via said mobile station, said establishing and authenticating being by transmitting by the mobile station at least a portion of information in the received user identification data to the communications network, receiving by the mobile station a challenge from the communication network to the first wireless device, forwarding the challenge to the first wireless device, receiving by the mobile station a response to the challenge from the first wireless device, and forwarding by the mobile station the response to the communication network.

30. The apparatus of claim 29, wherein said user identification data comprises an operator identifier.

31. The apparatus of claim 29, wherein said first wireless communication device does not have a long-range communication capability necessary to directly communicate with said network;
- wherein said mobile station is configured to receive said user identification data from a user data identification module comprising said user identification data of the user of said first wireless communication device.

32. An apparatus, comprising:
- a receiver in a mobile station for receiving user identification data of a first wireless communication device, said mobile station having its own communications network;
- a control unit in the mobile station, coupled to the receiver, for establishing and authenticating a connection through the mobile station to the mobile station's own communications network using the user identification data of said first wireless communication device, for transferring information content between the first wireless communication device and said communications network via said mobile station, said establishing and authenticating being by transmitting by the mobile station at least a portion of information in the received user identification data to the communications network, receiving by the mobile station a challenge from the communication network to the first wireless device, forwarding the challenge to the first wireless device, receiving by the mobile station a response to the challenge from the first wireless device, and forwarding by the mobile station the response to the communication network.

33. The apparatus of claim 32, wherein said received user data identification module is a module of a first operator, with the aid of which module the first wireless communication device can register, via said mobile station, to a network operated by said first operator.

34. An apparatus, comprising:
- means in a mobile station for receiving user identification data of a first wireless communication device, said mobile station having its own communications network;
- means in the mobile station, coupled to said first mentioned means, for establishing and authenticating a connection through the mobile station to the mobile station's own communications network using the user identification data of said first wireless communication device, for transferring information content between the first wireless communication device and said communications network via said mobile station, said establishing and authenticating being by transmitting by the mobile station at least a portion of information in the received user identification data to the communications network, receiving by the mobile station a challenge from the communication network to the first wireless device, forwarding the challenge to the first wireless device, receiving by the mobile station a response to the challenge from the first wireless device, and forwarding by the mobile station the response to the communication network.

35. A non-transitory computer readable medium having computer executable program code therein, comprising:
- computer executable program code in said computer readable medium for receiving user identification data of a first wireless communication device at a mobile station; and
- computer executable program code in said computer readable medium for establishing and authenticating through the mobile station a connection initiated by said first wireless communication device to said communications network using the user identification data of said first wireless communication device, for transferring information content between the first wireless communication device and said communications network via said mobile station, said establishing and authenticating being by transmitting by the mobile station at least a portion of information in the received user identification data to the communications network, receiving by the mobile station a challenge from the communication network to the first wireless device, forwarding the challenge to the first wireless device, receiving by the mobile station a response to the challenge from the first wireless device, and forwarding by the mobile station the response to the communication network.

36. A system, comprising:
a first wireless communication device having user identification data;
a mobile station in its own communications network;
said first wireless communication device supplying said user identification data to said mobile station;
said mobile station establishing and authenticating a connection from the mobile station to the mobile station's own communications network using the user identification data of said first wireless communication device, for transferring information content between the first wireless communication device and said communications network via said mobile station, said establishing and authenticating being by the mobile station transmitting at least a portion of information in the user identification data to the communications network, the mobile station receiving a challenge from the communication network to the first wireless device, the mobile station forwarding the challenge to the first wireless device, the mobile station receiving a response to the challenge from the first wireless device, and the mobile station forwarding the response to the communication network.

* * * * *